(No Model.) 2 Sheets—Sheet 1.

T. DARK.
STREET RECEIVER.

No. 416,830. Patented Dec. 10, 1889.

Witnesses
H. D. Nealy
C. P. Bailey

Inventor
Thos. Dark,
By his Attorney
J. R. Drake.

(No Model.) 2 Sheets—Sheet 2.

T. DARK.
STREET RECEIVER.

No. 416,830. Patented Dec. 10, 1889.

Witnesses.
H. D. Nealy.
C. P. Bailey.

Inventor.
Thos. Dark,
By his Attorney
J. R. Drake.

UNITED STATES PATENT OFFICE.

THOMAS DARK, OF BUFFALO, NEW YORK.

STREET RECEIVER.

SPECIFICATION forming part of Letters Patent No. 416,830, dated December 10, 1889.

Application filed June 7, 1889. Serial No. 313,426. (No model.)

*To all whom it may concern:*

Be it known that I, THOMAS DARK, a citizen of the United States, residing at Buffalo, in the county of Erie and State of New York, have invented certain new and useful Improvements in Street Receivers; and I do hereby declare the following to be a full, clear, and exact description of the invention, such as will enable others skilled in the art to which it appertains to make and use the same.

This invention relates to improvements on my former patents for street receivers, the object being to first overcome difficulties when such receivers are placed in streets that are afterward raised or lowered to conform to a new grade; and, second, to change the shape of the receiver at the back and bottom and set the stench-trap door at such an angle as to drop the water with more force into the trap and force the sand and sediment out of the trap into the sewer; and the invention, as constructed, will be understood by reference to the following specification and claims.

Figure 1:
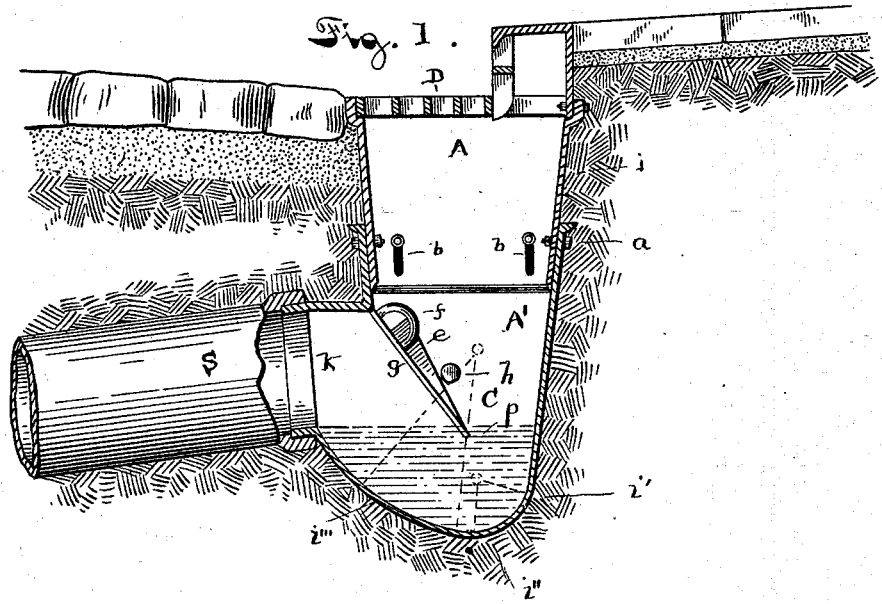
Figure 2:
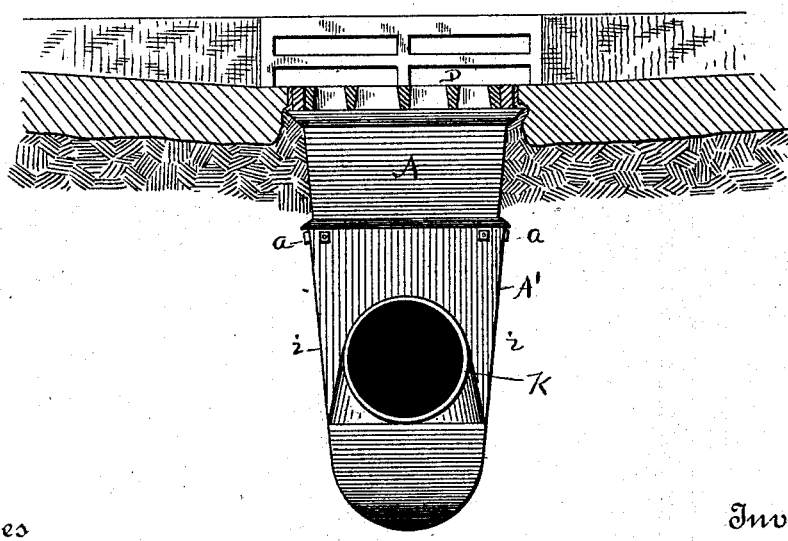
Figure 3:
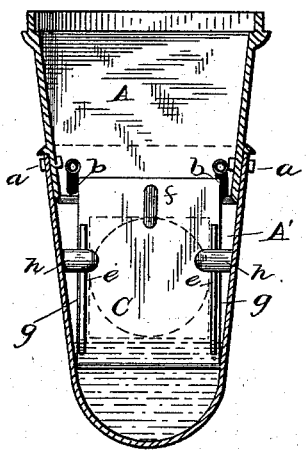
Figure 4:
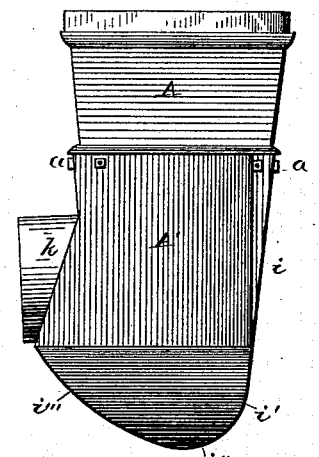
Figure 5:
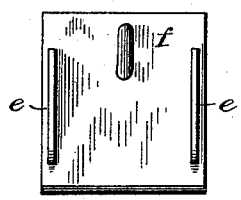
Figure 6:

In the drawings, Figure 1 is a cross-section through the whole device, and showing the grading; Fig. 2, front elevation of receiver in position; Fig. 3, front cross-section; Fig. 4, side elevation of whole receiver; Figs. 5 and 6, details of trap-door.

The receiver is made of iron in two parts, the upper section A, in which the grate D sets, and the bottom section A', both slanting from top to bottom. The upper part A sets a few inches inside the lower section A', "telescoping" therein, and held together, at such height desired, by bolts $a$ $a$ passing through both, the inside section A having vertical slots $b$ $b$ in the sides, so as to allow its being raised or lowered, and nuts on the bolts screwing against the sides. By these simple arrangements receivers set in new streets, and which are fixed as near the grade as possible at that time, can be made in a few minutes to conform to a new grade when the street is paved.

With the old receivers, when a new grade was established, if below or above, the connection with the sewer had to be broken and the receiver raised or lowered at considerable expense. My telescopic arrangement will avoid trouble or expense, as the nuts will only have to be unscrewed and the top part A raised or lowered, and the nuts again screwed tight. (See Figs. 1 and 3.) When the top part of the receiver is raised, a wedge is put in the space between the two receivers at each corner and the rest of the space filled in with cement to keep out the street dirt or concrete.

The back $i$ of the receiver is made to run at a slight slant from the top to a point $i'$ nearly opposite the end of the gate C, then giving a sharp curve $i''$ from thence to the bottom, and from thence a flat curve $i'''$ from that point up to the outlet $k$ into the sewer S. This leaves only a narrow space $p$ between the bottom of the trap-door C and the wall $i$, thus giving greater force to the water, and which is sufficient to supply the outlet into the sewer.

The trap-door C is set at an angle, as shown, on side pieces $g$ $g$, cast on the inside walls of the part A', and so as to carry the water falling through the grates from the street with force to the part $i'$, and leaving only the space $p$ between the end of the trap and back of the receiver to pass the water and forcing the sand and sediment out of the stench-trap and bowl thereof into the sewer, which I consider a great and important improvement on all other street-receivers. (See Figs. 1 and 3.)

The gate or trap C has inclined flanges $e$ $e$ (see Figs. 1, 3, 5, and 6) on the top near the edge, and round lugs $h$ project from the inside of the receiver-wall A', so that these inclines will strike against their under side and force the gate tightly against the side pieces $g$ $g$, (see Fig. 1,) making, in connection with the water in the receiver-bowl, a perfectly-tight trap.

A handle $f$ is cast on the gate C, so that it can be drawn up from the street by merely using a hook.

I claim—

1. A street receiver constructed in two sections A and A' of cast-iron and telescoped together, the upper section A adapted to be raised and lowered and held in position according to the grade of the street, substantially as hereinbefore fully set forth.

2. A street receiver constructed in two sections A A' of metal, the upper section A having vertical slots $b\ b$, and held inside section A', higher or lower by bolts and nuts $a\ a$, substantially as and for the purpose specified.

3. In combination with a street receiver having the inclines $g\ g$, and lugs $h\ h$, the gate C, constructed with inclined flanges $e\ e$, as and for the purpose specified.

In testimony whereof I affix my signature in presence of two witnesses.

THOMAS DARK.

Witnesses:
J. R. DRAKE,
GEO. A. BURNETT.